United States Patent [19]

Burke

[11] 3,752,923

[45] Aug. 14, 1973

[54] FREQUENCY SHIFT KEYED GENERATING SYSTEM

[75] Inventor: Nelson W. Burke, Stoneham, Mass.

[73] Assignee: Honeywell Information Systems, Inc., Waltham, Mass.

[22] Filed: Dec. 9, 1971

[21] Appl. No.: 208,045

[52] U.S. Cl. .......... 178/66 R, 178/66 A, 325/163, 332/16 R

[51] Int. Cl. .......... H03c 3/02

[58] Field of Search .......... 178/66 R, 66 A; 325/30, 163; 332/9 R, 9 T, 16 R, 16 T

[56] References Cited

UNITED STATES PATENTS 3,638,142 1/1972 Widl et al. .......... 332/9 R 3,648,195 3/1972 Marino .......... 332/16 T X

*Primary Examiner*—Charles E. Atkinson
*Assistant Examiner*—R. Stephen Dildine, Jr.
*Attorney*—Faith F. Driscoll et al.

[57] ABSTRACT

A transmitter produces a plurality of frequencies for application to a communications channel by generating a number of triangular waveforms in response to a plurality of selection signals and converts these waveforms into their respective frequencies.

28 Claims, 5 Drawing Figures

INVENTOR.
NELSON W. BURKE
BY Faith F. Driscoll
ATTORNEY

INVENTOR.
NELSON W. BURKE

BY Faith F. Driscoll
ATTORNEY

INVENTOR.
NELSON W. BURKE
BY *Faith F. Driscoll*
ATTORNEY

INVENTOR.
NELSON W. BURKE

BY Faith F. Driscoll

ATTORNEY

FREQUENCY SHIFT KEYED GENERATING SYSTEM

BACKGROUND OF THE INVENTION

Field of Use

This invention relates to data transmission systems and more particularly to a modulator system for use in transmitting frequency shift keyed signals.

Discussion of Prior Art

A common method of transmitting information between two data processing units over a communications channel is termed frequency shift keying (FSK). This method is one in which the information to be transmitted is converted into audio tones whose frequency depends on the state of the information being transmitted.

In general, the transmitter includes a multivibrator circuit which is commonly used to generate the different frequencies required for FSK transmission. In some prior art devices, the transmitting apparatus is arranged for shifting the frequency of the multivibrator circuit by varying the voltage associated with the resistor-capacitor network within the circuit. Other prior art devices select different input resistances of a transistor pulse generator which drives a multivibrator circuit for generating the required frequencies.

The resultant square wave waveform of the multivibrator circuit in either arrangement is thereafter fed to a low pass filter network arranged to have sufficient attenuation to supress harmonics of the generated carried frequencies to convert the square wave waveform into a sinusoidal waveform. The waveform is then transmitted over the communications channels which usually corresponds to a conventional telephone network.

It has been found that when converting the multivibrator generated square wave into a sine wave it is advantageous to have the band pass of the low pass filter such that the higher of the two FSK frequencies corresponds to the cutoff point of the filter so that the lower of the two frequencies falls within the filter band pass. This arrangement enables the filter to attenuate all of the frequency hamonic components of the higher frequency by having them fall outside of the stop band of the filter.

However, it will be appreciated that some of the frequency components of the lower frequency pass through the filter and distort the shape of the lower frequency waveform. Therefore, in order to compensate for lower frequency distortion, it has been the practice in some prior art systems to shift the two frequencies relative to the filter band pass in order to increase the filter's attenuation of the lower frequency components.

It has been found that the above arrangement results in producing a higher frequency waveform characterized as having an amplitude which is noticeably less than the amplitude of the lower frequency waveform. Accordingly, when the two frequencies to be shifted by the system occur farther apart in frequency, the problem of distortion is further complicated. Moreover, additional problems arise when the system is required to generate more than two frequencies during normal information transmission.

Another problem with the prior art systems described above is the attenuation by the filter network of the sideband frequencies which constitute the modulated FSK signal.

Attenuation of the sideband frequencies cause the resultant sine wave to be distorted at crossover time (i.e., the time the frequency is shifted from one frequency to another). Since the higher data rates (i.e., those rates which are large relative to the lowest frequency generated) require that at least the sideband frequencies close to a selected frequency (i.e., mark, space) be preserved, attenuating the square wave by a low pass filter network in order to convert it into a sine wave results in degradation of the resultant FSK signal at the crossover periods.

Notwithstanding the fact that the frequency modulation of signals permits signals to be recovered despite changes in carrier amplitude, and distortion at crossover, distortion in the amplitude, phase, and shape of these signals can still affect the integrity of the signal to the extent that the signal together with further distortions introduced by the telephone network can produce undesirable errors in the information transmitted and processed by the receiver. Further, and more importantly, in some instances where the receiver does not include sharp filter networks, it may not be able to detect the waveforms being transmitted. Moreover, the distortion of the transmitted waveforms at the crossover periods by the conversion network can result in loss of information at higher data transmission rates. Namely, the resulting time displacements occurring in the demodulated signal generated by the receiver in response to the transmtted waveforms produced by such crossover distortions can be incorrectly interpreted in deriving the data transmitted.

Accordingly, it is an object of the present invention to provide a highly reliable modulation system which facilitates converting signals of different frequencies for application to a communications channel.

It is a further object of the present invention to provide a modulation system which shifts the frequency of a particular shaped waveform to produce signals of different frequencies which are easily converted into constant amplitude signals characterized by minimum crossover distortion.

It is a more specific object of the present invention to provide an improved low cost transmitter for generating a plurality of frequency shift keyed signals in response to signals applied thereto by a terminal device associated therewith.

SUMMARY OF THE INVENTION

The foregoing objects are achieved in a preferred embodiment of the present invention which includes a transmitter operative to produce a triangular shaped waveform whose frequency is shifted in response to input selection signals applied to a manner of input selection lines.

The transmitter includes a generator arranged to produce triangular waveforms of different frequencies only in response to input selection signals. Because the generator is selectively enables, it obviates the need for a number of free-running oscillator circuits for generating different frequency output signals which have to be phased or synchronized with the data or control information to be transmitted.

In the illustrated embodiment, a conversion circuit shapes the different frequency triangular waveforms supplied thereto into their fundamental sinusoidal waveforms having equal amplitudes. It will be appreciated that the invention by utilizing a triangular waveform whose harmonics are inherently so much smaller in amplitude than those inherent in square wave waveforms is able to obtain resultant waveforms sinusoidual in nature which are essentially distortion free and have the same amplitudes for any required number of selectable frequencies. Further, the invention greatly facilitates any normal conversion process by its utilization of a triangular waveform. In fact, it may be desirable to eliminate entirely the conversion circuits and use the effective filtering action of the communications channel.

In more particular terms, the transmitter of the preferred embodiment comprises a triangular waveform generator including an active source having a plurality of selectable control input and output circuits for providing linear current charging and discharge paths for a capacitive storage element of the generator in response to selection input signals applied thereto. A comparator circuit within the generator provides a pair of complementary control signals in response to the selection signals. These signals condition the input and output circuits alternately to control the charging and discharging of the capacitive storage element at a predetermined rate thereby producing a triangular voltage waveform having a desired fundamental frequency.

The voltage comparator circuit is coupled to the capacitive storage element and is arranged to accurately establish the upper and lower end points for the positive and negative going excursions of each of the triangular waveforms developed by the generator so as to establish the same amplitude for the triangular voltage waveform notwithstanding changes in its frequency. The comparator circuit in the embodiment is connected in a feedback arrangement which includes a variable voltage divider network for providing easily established and independently adjustable lower voltage reference levels over a wide range of voltages. This arrangement enables ease in selecting an increment of voltage for the triangular wave which utilizes only the linear portions the discharge waveform produced by the generator for all of the different frequencies selected.

The above and other objects of this invention are achieved in an illustrative embodiment described in greater detail hereinafter. Novel features which are believed to be characteristic of the invention both as to its organization and method of operation, together with further objects and advantages thereof will be better understood from the following description considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
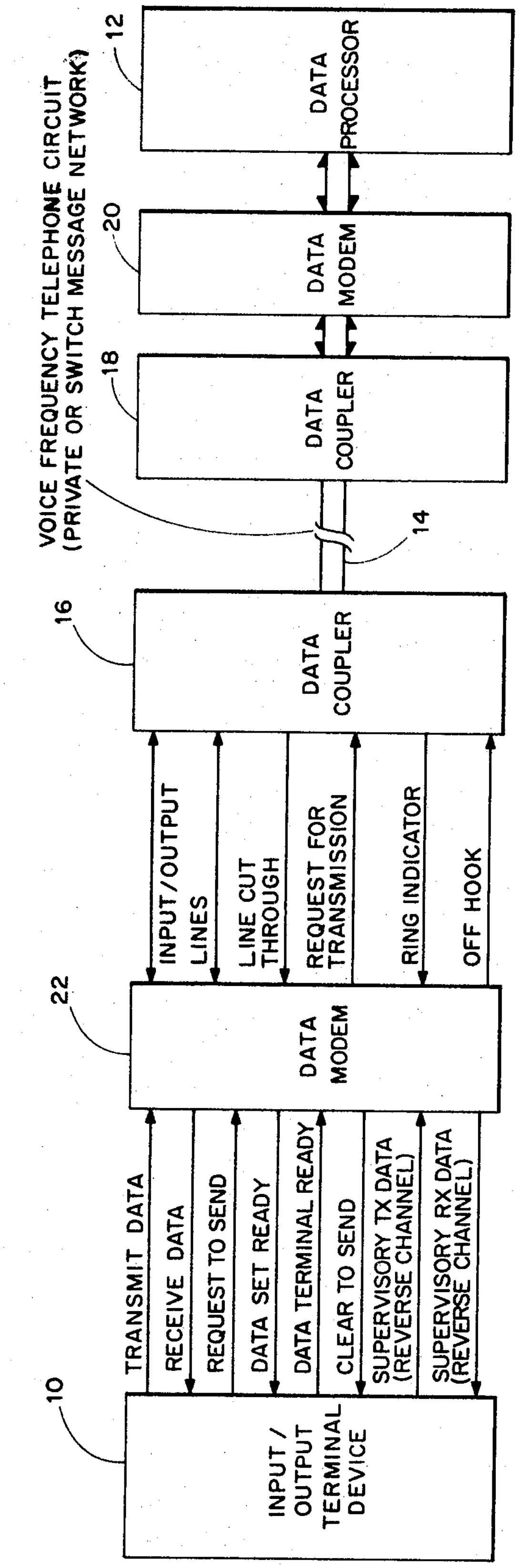
FIG. 1 shows in block diagram form a system incorporating the present invention.

FIG. 1 shows, in block diagram form, a data communications system for transmitting information between two data processing devices 10 and 12 via a communications channel 14 and data couplers 16 and 18 associated with data modems 20 and 22.

The data processing devices 10 and 12 any input or output terminal device any processor operative to transmit and receive digital information signals. For example, the terminal device 10 may take the form of a data terminal station which preprocesses data for transmission to a remote location data processor 12. As shown, communication between the two devices proceeds through data couplers 16 and 18 in a conventional manner via telephone lines 14 connected to either a private or switch message network.

The left side of FIG. 1 illustrates the pertinent interface lines between data modem 22 and data coupler 16 in addition to those lines between the modem 22 and device 10. The same interface arrangement can be also assumed to connect the units shown at the right side of FIG. 1.

The data coupler 16 is conventional in design and may take the form of one of the couplers described in a publication titled "Bell System Data Communications Technical Reference — Data Couplers CBS and CBT for Automatic Terminals" published by the American Telephone and Telegraph Company dated August, 1970. It will be appreciated that the inferface lines designated in FIG. 1 will change as a function of the access arrangement chosen and therefore the arrangement disclosed should in no way be regarded as limiting with respect to the subject invention. The functions of the interface lines shown will be described hereinafter in greater detail in connection with the description given for system operation with specific reference made to FIG. 3*b*.

Figure 2A:
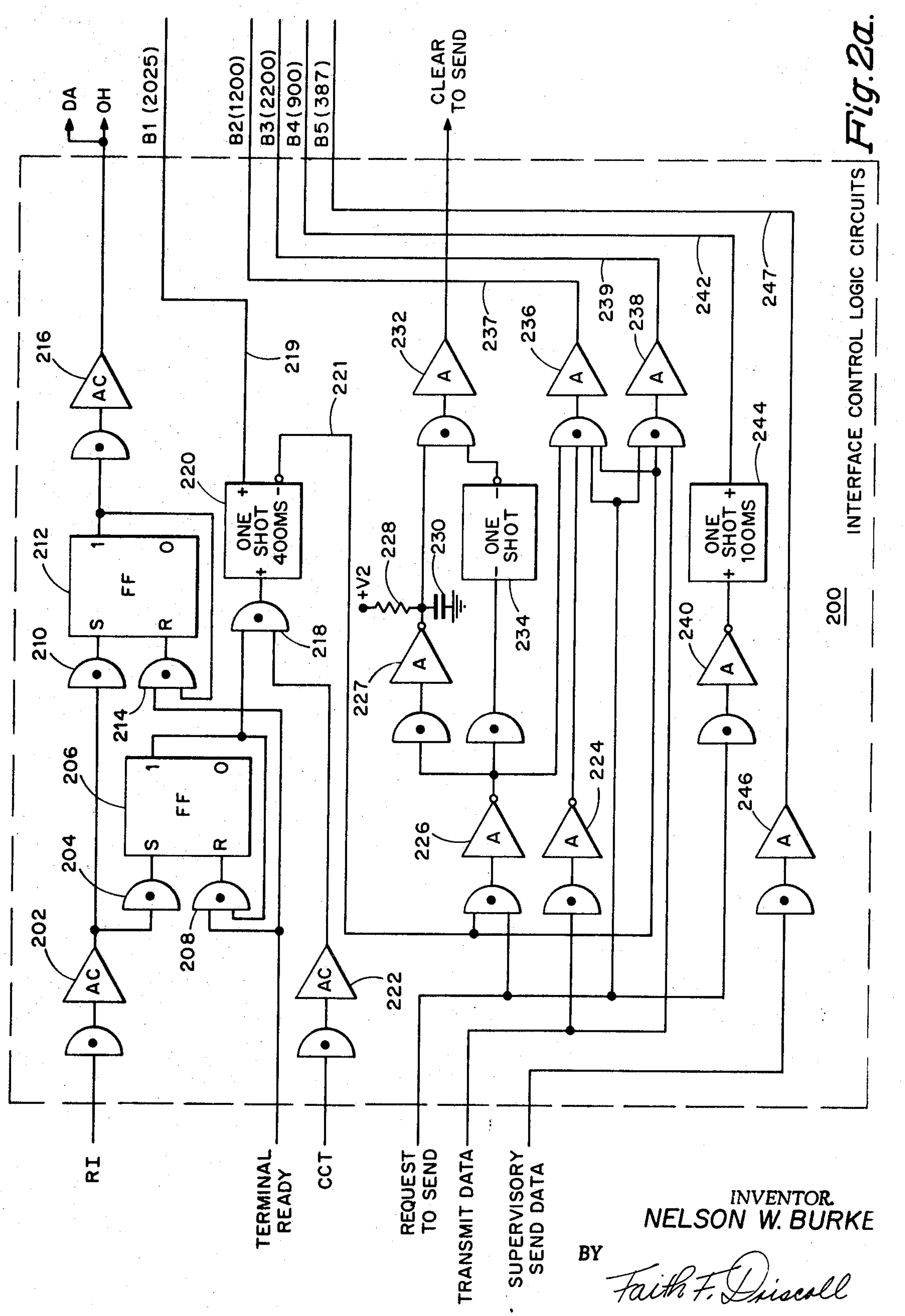
FIG. 2*a* shows in greater detail, the control section of the data modem of FIG. 1.
Figure 2B:
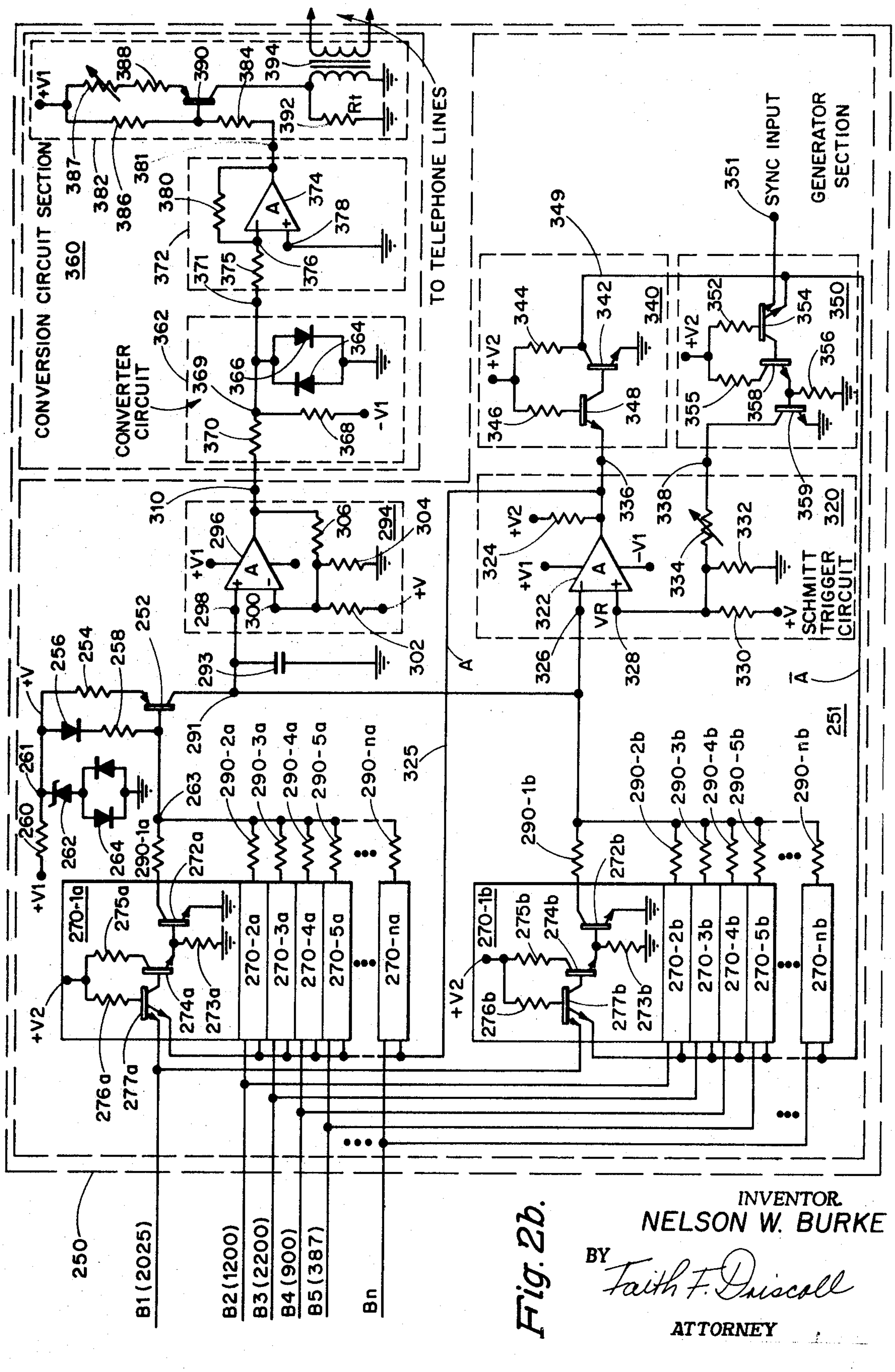
FIG. 2*b* shows in greater detail, the transmitter section of the data modem of FIG. 1.

Referring to FIGS. 2*a* and 2*b*, it will be noted that the pertinent control logic circuits and the transmitter circuits of the data modem 22 of FIG. 1 are disclosed respectively in greater detail within blocks 200 and 250 respectively.

The logic circuits of block 200 include driven circuits 202 and 222 which convert the normally bipolar voltage levels applied to a pair of lines RI and CCT to suitable logic voltage levels to be utilized by the internal logic circuits illustrated. Conversely, the driver circuit 216 converts the logic voltage levels generated by the internal logic circuits into bipolar voltage levels suitable for utilization by the data coupler 16 and these levels are applied to a line DA and a line OH.

The above described driver circuits are conventional in design and may take the form of level shifting circuits disclosed in the text titled "Pulse and Switching Circuits" by Millman and Taub, McGraw Hill Book Company, Inc., Copyright, 1965.

The converter circuit 202 feeds a first of a pair of flip-flops 206 and 212 via AND gates 204 and 210. The converter circuit 222 feeds a one-shot circuit 220. The one-shot circuit 220 is conventional in design and may for example take the form of the retriggerable monostable multivibrator circuit described in the publication titled "9601 Retriggerable Monostable Multivibrator" published by Fairchild Semiconductor Inc., Copyright, 1968. The one-shot circuit 220 when triggered via an input AND gate 218, applies complementary output signals to lines 219 and 221. The line 219 is applied as a first input to the Transmitter Section 250 and the line 221 is applied as an inhibiting input to a pair of AND gate and amplifier circuits 236 and 238.

The complement or inversion of the output signal applied to line 219 is indicated by the circle at line 221. Similarly, the circles at the output of amplifier circuits 224 and 226 in FIG. *2a* are also used to indicate that these circuits invert the input signals applied thereto.

A control signal level representative of a binary "1" when applied to a TERMINAL READY line by the input terminal device (e.g. data processor, etc.) causes the setting of flip-flops 206 and 212 respectively via hold gates 208 and 214 and thereby places the data modem 22 in a state for processing a call. That is, each of the flip-flops 206 and 212 is arranged to have its binary 1 output connected back via its input gate to a hold or recirculation input R which allows a binary 1 on line RI to switch the flip-flop to a 1 only when the TERMINAL READY line is a binary 1. Each of the flip-flops is reset to a binary "0" upon removal of the holding signal applied to each of the inputs R when the TERMINAL READY line is forced to a binary 0.

Subsequent to forcing the TERMINAL READY line to a binary 1, the terminal device 10 when it has data to transmit signals the data modem 22 by applying a control signal to a REQUEST TO SEND line. This line is coupled as an input to an AND gate and inverter circuit 226 whose output is coupled jointly to the input of a gate and inverter circuit 227 and to the input of a one-shot circuit 234. The output of inverter circuit 227 connects in series with a delay circuit which includes a resistor 228 and a capacitor 230 connected to a supply voltage +V2 as shown. The inverter 227, in this arrangement, is assumed to take the form of the inverter circuits shown in blocks **270-1*a* and 270-1*b*. As such, the inverter 227 has an opening collector output stage which has a resistor 228 as its collector load resistor. The output of the delay circuit (i.e. junction formed by resistor 228 and capacitor 230) and the inverted or complement output of one-shot 234 are applied as inputs to an AND gate and amplifier circuit 232 whose output couples to a line designated CLEAR TO SEND. Additionally, the control signal applied to the REQUEST TO SEND line is also applied to a gate inverter circuit 240 and AND gate amplifier circuit 236 and 238. The output of inverter circuit 240 connects as an input to a one-shot circuit 244. The output of the one-shot circuit is applied to the Transmitter Section 250 via a line 242**.

When the data modem 22 is ready to accept data for transmission, it applies a control signal to the CLEAR TO SEND line which is returned to the terminal device 10 and initiates the transmissions of data signal levels to a TRANSMIT DATA line.

The assertions of the data signal levels representative of binary 1 and 0 data generated by the terminal device are applied via the TRANSMIT DATA line to the AND gate and amplifier circuit 238 and then to the Transmitter Section 250 via line 239 when the AND gate 238 is enabled to appropriate signal levels from the REQUEST TO SEND line and line 221. The inversions of the data levels produced by a gate inverter circuit 224 are applied to an AND gate and amplifier circuit 236. These signal levels are thereafter applied to the Transmitter Section 250 via a line 237 when the AND gate 236 is enabled by signal levels from the REQUEST TO SEND line and line 221.

A last control signal level applied by the input terminal device to a line SUPERVISORY SEND DATA is in turn applied to the Transmitter Section 250 via a gate amplifier circuit 246 along the line 247. The SUPERVISORY SEND DATA line, as described herein, is used to implement the so-called "reverse channel" capability which provides a means of simultaneous communication between receiving and transmitting terminals of a two wire data transmission system.

The Transmitter Section 250 of the data modem 22 comprises a triangular wave generator section 251 and a conversion circuit section 360. The generator section 251, as shown, includes a transistor current source with a number, *n*, of input circuits for conditioning the source to supply "*n*" different values of current to charge a capacitive storage element 293 linearly at selected different rates of current. The generator section 251 further includes a corresponding number of output circuits for providing "*n*" individual paths for discharging the capacitive storage element 293 linearly at a corresponding number of different rates. It will be noted that "*n*" is used herein to designate any non-zero integer.

In greater detail, the transistor current source includes a PNP transistor 252 having its emitter electrode connected in series with an emitter resistor 254 to a supply voltage +V1 through a resistor 260. A series biasing voltage network including a diode 256 and a resistor 258 also connect the base electrode of transistor 252 to one end of the resistor 260 forming a junction 261. The supply voltage, +V1 and a temperature compensating network a zener diode 262 and a diode network 264 are connected to maintain junction 261 at a constant voltage, +V.

The current source input circuits include a plurality of transistor transistor logic (TTL) gate inverter driver circuits **270-1*a* through 270-*na* which connect in parallel respectively through resistor 290-1*a* through 290-*na* with the input circuit of current source transistor 252 via its base electrode. The output circuits which connect in series with the output circuit of the current source transistor include a second plurality of TTL gate inverter driver circuits 270-1*b* through 270-*nb* which connect respectively to resistors 290-1*b* through 290-*nb* to junction 291 in common with one end of capacitive element 293.**

As illustrated in FIG. *2b*, all of the gate inverter circuits may be identical in construction. In particular, each circuit may include a two input gate transistor input circuit **277*a* which feeds a phase splitter transistor 275*a* which drives a further inverter transistor 272*a*. The transistor 272*a* has its collector-emitter path connected in series with one of the resistors 290-*a*. In the foregoing arrangement, each of the gated circuits operates as a switch for connecting the disconnecting a particular one of the resistors 290-1*a*, 290-1*b* through 290-*na*, 290-*nb*** associated therewith to a reference voltage potential illustrated as ground in FIG. *2b*.

The generator section 251 further includes a level detector circuit 320 which connects to the junction 291. This circuit has a known hystersis characteristic and may, for example, include a Schmitt trigger circuit implemented using a single amplifier 322, conventional in design, connected as shown. More specifically, the circuit 322 may take the form of such circuits as those described in a publication titled "LM111/LM211 Voltage Comparator" by National Semiconductor Corporation, Copyright, 1970.

As shown in FIG. 2b, the comparator amplifier 322 has an amplifying or noninverting input terminal 328 and an inverting input terminal 326. The input terminal 328 connects to a junction of a voltage divider network including resistor 330, 332, and 334 which connect at one end to the voltage source, +V as shown. The inverting input terminal 326 connects to the junction 291. It will be noted that the amplifier 322 drives a load resistor 324, the other end of which connects to a source of supply voltage, +V2. The circuit 320 applies a logic output signal level to a line 325 and to a terminal 336 which terminal connects as an input to another TTL gate inverter circuit 340. The inverter circuit 340 which includes a pair of transistors 348 and 342 and a pair of resistors 346 and 344 is operative to invert the input logic signal level and apply the complement thereof to both an output line 349 and as one input to a further TTL gate and driver circuit 350.

The circuit 350 of FIG. 2b which includes transistors 354, 358, and 359 and resistors 352, 355, and 356 is identical in construction to other gate inverter circuits discussed above. As shown, the inverter circuit 350 also is arranged to receive a synchronizing input signal from a second input terminal 351 labeled SYNC INPUT. The circuit 350 by switching output transistor 359 "on" and "off" in response to such signals connects and disconnects respectively an output terminal 338 to a reference potential illustrated as ground. The terminal 338 connects to one end of a variable resistor 334 which forms part of the voltage divider network as described above.

The voltage divider network arrangement permits a change in the voltage level applied to terminal 328 to be accurately established by the divider network through the on-off switching of output transistor 359 so as to make such voltage level independent of the characteristics of transistor 359 (i.e., collector to emitter voltage VCE is very small as compared to the voltage development across resistor 332).

The pair of complementary signal levels A and A derived from the Schmitt trigger circuit 320 are applied via lines 325 and 349 respectively as a common control input to each of the gate inverter driver circuits **270-1*a* through 270-*na* and to gate inverter driver circuits 271-*b* through 270-*nb*. As shown, the internally generated common control signal levels A and A are combined with further signals generated by the interface control logic circuit section 200** to enable and/or disable selected pairs of the gate/inverter driver circuits in the sequence desired.

The generator section 251 is also shown to further include an amplifier circuit 294 which has a noninverting input terminal 298 connected to the junction 291 and an inverting input terminal 300 connected to a reference voltage. The reference voltage applied to inverting terminal 300 is established by a voltage divider network including resistors 302, 304, and 306. As shown, one end of the divider network connects to the supply voltage, +V and the other end connects to an amplifier output terminal 310.

The amplifier circuit 294 is conventional in design and for example, may take the form of such circuits described in a publication titled "u747C Dual Frequency Compensated Operational Amplifier" published by Fairchild Semiconductor Corporation, Inc., Copyright 1969.

The amplifier circuit 294 amplifies the triangular waveform developed across the capacitor 293 and applies the waveform to the Conversion Circuit Section 360. The Conversion Section 360 includes a "square law" circuit 362 which connects in series with an amplifier circuit 372 and an output driver circuit 382. The "square law" operated circuit 362, conventional in design, includes resistors 370 and 378 and a pair of diodes 364 and 366. The resistors 370 and 368 form a voltage divider whose one end connects to terminal 310 and other end connects to supply voltage −V1, as shown. The output of the divider connects to one end of 371. The other ends of the diodes 366 and 364 connect in common to a reference voltage potential illustrated as ground.

The circuit 362 produces a current proportional to the square of the effective value of the input voltage thereby converting the triangular voltage waveform into a sinusoidal waveform. In particular, the current produced is proportional to the product of the input voltage and the transfer characteristic of the diode network 364. For additional information concerning the use of square law operated circuits reference may be made to the text titled "Electronic Designers' Handbook" by R. W. Landee, D. C. Davis, and A. P. Albrecht (McGraw-Hill Book Company, Inc.), Copyright 1957.

The square law circuit 362 applies the sinusoidal output waveform to line 371 for amplification by amplifier circuit 372. The circuit 372 includes an amplifier 374 whose inverting input terminal 376 connects to line 371 through a series resistor 375 and to its output terminal 381 through a feedback resistor 380. The noninverting input terminal 378 of the amplifier 374 connects to a reference potential illustrated as ground. The amplifier 374 may be equivalent in construction to circuit 296.

The amplifier 374 applies an amplified sinusoidal waveform via an output line 381 as an input to current driver output circuit 382. As shown, the driver circuit 382 includes a PNP transistor 390 which couples via the data coupler 16, not show, to the telephone line through a transformer 394. More particularly, the collector electrode of transistor 390 directly connects to the primary of transformer 394 which is shunted by a line termination resistor 392. The emitter electrode of transistor 390 connects through series connected fixed resistor 388 and variable resistor 387 to the supply voltage +V1. And, the base electrode of transistor 390 connects to the supply voltage +V1 and to the terminal 381 respectively through a resistor 386 and a resistor 384.

OPERATION OF TRANSMITTER SECTION 250

In general, the triangular wave generator in accordance with the state of control data signal levels B1, B2, B3, B4, and B5 respectively applied to input lines 219, 237, 239, 242, and 247 is operative to selectively enable one of the gate inverter driver circuit pairs for generating a triangular waveform across capacitor 293 having a predetermined frequency established by the switching of complementary control signal levels A and A. In particular, referring to FIG. 3a, the operation of the generator section 251 is as follows. It is assumed that the line 219 is first enabled by forcing the signal level B1 to a binary 1 (i.e. positive voltage +V2) and that the capacitor 293 is initially in an uncharged state. Also, at this time, circuit 320 is in an initial unswitched state at which time control signal levels A and A respectively, are at a +V2 and zero volts. Accordingly, when the combination of signal levels B1 and A are both binary 1's, they reverse bias the base-emitter junctions of transistor 277*a* of gate inverter circuit 270-1*a*. This causes current to flow from the voltage supply + V2 through resistor 276 into the base electrode of transistor 274*a* switching the transistor into conduction. The transistor 274*a* when conductive causes output transistor 272*a* to switch into saturation which places load resistor 290-1 at ground potential. By such action, the current source transistor 252 is enabled and conditioned by the level of voltage applied to its base electrode to supply a predetermined amount of charging current to the capacitor 293. The value of the aforementioned voltage level applied to the base electrode is established by the voltage divider including resistor 258 and selected resistor 290-1*a*.

It will be noted that during the above charging time interval, all remaining gate inverter circuits have at least one of their inputs at a binary 0 signal level (e.g. input signal levels B2-B*n* are at binary 0's). Accordingly, at least one of the emitter junctions of each of the other input transistors (i.e. those transistors corresponding to transistor 277*a*) is forward biased which causes the current to flow through the emitter electrode of their respective input transistors and into the driving source rendering their phase splitter and output transistors (i.e., those equivalent to transistors 274 and 272) nonconductive. Therefore, all remaining resistors 290-2*a* through 290-*na* as well as resistors 290-1*b* through 290-*nb* are unconnected or "floating" with respect to ground potential.

Figure 3A:
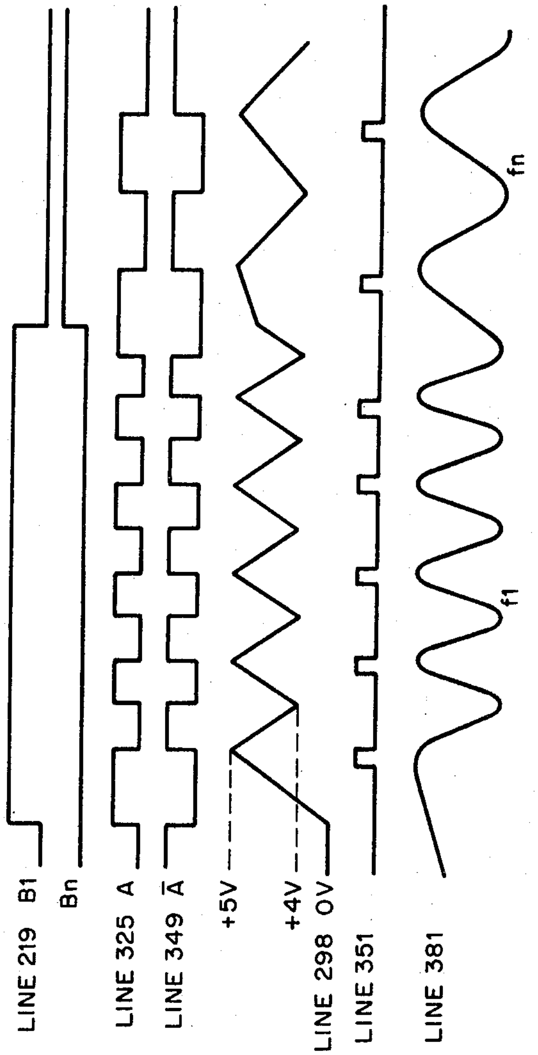
FIG. 3*a* shows waveforms useful in describing the operation of the transmitter portion of FIG. 2.

It will be noted from FIG. 3a that the capacitor 293 charges toward a predetermined value of voltage (e.g.,+5 volts). This value is established by the voltage divider resistors 330 and 332. The resistor 34 is "floating" as the value of signal level A causes output transistor 359 to be nonconductive. The aforementioned predetermined value of voltage corresponds to the maximum hystersis or peak voltage level established by the value of reference voltage applied to terminal 328 of the Schmitt trigger circuit 320. When the voltage across capacitor 293 reaches this maximum value, the Schmitt trigger circuit 320 switches state in turn forcing signal level A to a voltage level representative of a binary 0 (i.e., zero volts) and signal level A to a voltage level representative of a binary 1 (i.e., +V2 volts).

From FIG. 2b, it will be noted that when the signal level A and B1 are both 1's, the output transistor 272*b* of the other gate inverter driver circuit 270-1*b* of the pair is switched into conduction while the output transistor 272*a* of the gate inverter circuit 270-1*a* is switched to a nonconductive state. At this time, resistor 290-1*b* provides a discharge path for capacitor 293 through the emitter-collector path of conductive transistor 272*b*. Also, the change in value of signal level A causes output transistor 359 to be conductive which connects resistor 334 to ground. The resistor 334 as part of the voltage divider including resistors 330 and 332 and source +V establishes another value of reference voltage for Schmitt trigger circuit 320.

When the capacitor 293 is discharged to a second voltage level (i.e. 4 volts) corresponding to the minimum hystersis or valley voltage level of the Schmitt trigger circuit 320, the circuit 320 switches states forcing the signal levels A and A back to their initial states.

The alternate switching of signal levels A and A as illustrated in FIG. 3*a* continues so long as the signal level B1 remains a binary 1 designating the selection of that particular frequency. As soon as the signal level B1 switches to a binary 0 and another level, as for example, Bn is switched to a binary 1 designating the selection of another frequency, the Schmitt trigger circuit 320 causes signal levels A and A to again alternately switch state as illustrated in FIG. 3*a*.

It will be noted that the signal level Bn selects a different inverter circuit pair corresponding to gates 270-*na* and 270-*nb* with corresponding resistors 290-*na* and 290-*nb* whose values are selected to establish the desired frequency. In accordance with the waveforms of FIG. 3*a*, this frequency will be lower than the frequency selected by signal level B1.

Considering the operation of the Transmitter Section 250 at frequency Bn in greater detail, it will be appreciated that the resistor 290-*na* is selected to have a larger value of resistance so as to establish a higher value of voltage at the base electrode of current source transistor 252 which decreases the magnitude of current supplied by the transistor. Accordingly, capacitor 293 requires a longer time interval to charge to the predetermined voltage level, +5 volts and thereby produces a corresponding decrease in the frequency of the generated triangular waveform. In the manner previously described, the Schmitt trigger circuit 320 switches state in response to capacitor 293 charging to the aforementioned maximum value which in turn activates the inverter circuit 270-*nb* and deactivates the inverter circuit 270-*na*. When activated, the inverter circuit 270-*nb* provides a discharge path for capacitor 293 through the collector-emitter electrodes of its output transistor and through resistor 290-*nb*.

It will be noted that the resistor 290-*nb* is selected to have a resistance value larger than resistor 290-1*b* so as to provide a longer discharge time, equal to its aforementioned charge time, for the same voltage change (i.e., 1 volt). The voltage change of one volt is selected so that only a small portion (i.e., the linear portion) of the normal discharge time provided by the capacitor 293 and a selected resistor is utilized. Hence, the discharge time for a given change in voltage can be accurately selected for each frequency by selecting different values of resistances. The resistance value for each frequency is chosen to provide a discharge current rate for capacitor 293 which is the same as the charge current rate.

When the capacitor 293 discharges to the minimum value (i.e., +4 volts), the Schmitt trigger circuit 320 is conditioned by the decrease in level to switch back to its initial state. As mentioned previously, the alternate switching of the state of complementary control signals A and A by Schmitt trigger circuit 320 and accompanied charging and discharging of capacitor 293 continues until the control signal level Bn is switched to a binary 0 state.

It will be readily appreciated that using the inverter gates circuits in combination with different resistors as "current sinks" minimizes considerably the complexity of the generator section 251. The values of resistors and other components for the frequencies required in the system of FIG. 1 are given in the table herein to follow. These values are given for the purpose of illustration only and should in no way be construed as a limitation of the present invention.

TABLE

| RESISTORS | VALUES IN KILOHMS |
|---|---|
| 254, 330, 368 | 1 |
| 258 | 0.620 |
| 260 | 0.300 |
| 290-1*a*, 290-3*b* | 2.74 |
| 290-2*a* | 4.87 |
| 290-3*a* | 2.43 |
| 290-4*a*, 290-4*b* | 6.65 |
| 290-5*a* | 6.81 |
| 290-1*b* | 2.94 |
| 290-2*b* | 5.11 |
| 290-5*b* | 7.5 |
| 302 | 3 |
| 304 | 3.9 |
| 306 | 11.0 |
| 324, 344 | 3.3 |
| 332 | 1.5 |
| 334 | 5 |
| 370 | 0.820 |
| 375 | 10 |
| 380 | 30 |
| 382, 384 | 5.1 |
| 387 | 2.5 |
| 388 | 0.910 |
| 392 | 0.6 |
| CAPACITORS | VALUES IN MICROFARADS |
| 293 | 0.47 |
| SUPPLY VOLTAGES | VALUE IN VOLTS |
| +V | 9.8 |
| +V1, −V1 | 15 |
| +V2 | 4.3 |

Continuing on with the description of the operation of the generator section reference is now made to FIG. 2*b*. The triangular waveform produced by the charging and discharging of capacitor 293 under the control of the Schmitt trigger circuit 320 is applied to the non-inverting terminal 298 of amplifier circuit 294. The amplifier circuit 294 provides the desired value of D-C voltage at output terminal 310 and amplifies the triangular waveform before it is applied to the square law operated circuit 362. More importantly, the amplifier circuit 294 isolates the output of generator section 251 from the square law circuit 362.

The voltage divider action of series resistors 370 and 368 establish the required level of zero volts DC at junction 369 so that the triangular waveform varies about the value (i.e., approximately ± 1 volt) and is of an amplitude to operate the circuit within its small signal region. It will be appreciated that the output of the amplifier can be AC coupled to the converter circuit as an alternative to the voltage divider arrangement just described.

Each of the diodes 364 and 366 as mentioned operate in the small signal region of its parabolic shaped characteristic curve to produce a current proportional to the square of the effective value of the triangular waveform voltage. Accordingly, the diodes produce an output voltage which approximates the square of the input voltage and shapes the triangular waveform into a sinusoidal waveform.

It will be appreciated that when the triangular waveform input is converted by the square law circuit 362, the circuit produces a good approximation of a sine wave notwithstanding the frequency of the waveform selected. The primary reason as mentioned previously is that the harmonic composition of the triangular waveform eliminates distortion of the resulted sine wave during the conversion process. Specifically, the amplitude of each of the harmonics which compose the triangular wave is significantly less than those which compose a square wave. Therefore, when each of the harmonics of the triangular wave is applied to the square law circuits, the output voltage produced which is proportional to the square of the input voltage is decreased at a rate greater than that of a square wave. The result is that the harmonics of the triangular wave as contrasted with those of the square wave have very little affect on the shape of the output waveform. And, the waveform is established primarily by the fundamental or basic waveform of the triangular wave.

More importantly, since the harmonics of the triangular wave are small in amplitude, conversion of the wave into a sine wave results in minimum attenuation of the sideband frequencies. Accordingly, distortion of the resultant signal at the crossover periods is minimal as a result of retention of the sideband frequencies.

The sine wave output of the square law operated circuit 362 is amplified to a suitable level and applied to the input circuit of the driver transistor 390 and thence AC coupled through transformer 394 via the coupler 16 (not shown) to the telephone line. The amplifier circuit 372 performs functions similar to those of amplifier circuit 294. Specifically, it amplifies the sine wave to a suitable level and matches the impedance of the converter circuit to the input impedance of the output circuit 382 and amplifies the sine wave to a suitable level thereby enabling adjustment of the amplitude of the sine wave applied to the input of transistor 390.

SYSTEM OPERATION

With reference to FIGS. 1, 2*a*, 2*b*, and 3*b*, the operation of the data modem 22 of FIG. 1 will now be described. It is assumed for the purpose of this example that the called location including the input/output terminal device 10 is going to transmit information to the data processor 12. In accordance with conventional procedures, the data processor 12 initiates the dialing of the terminal device location through an automatic calling unit which in turns causes the generation of a ringing signal through conventional telephone apparatus, not shown.

Figure 3B:
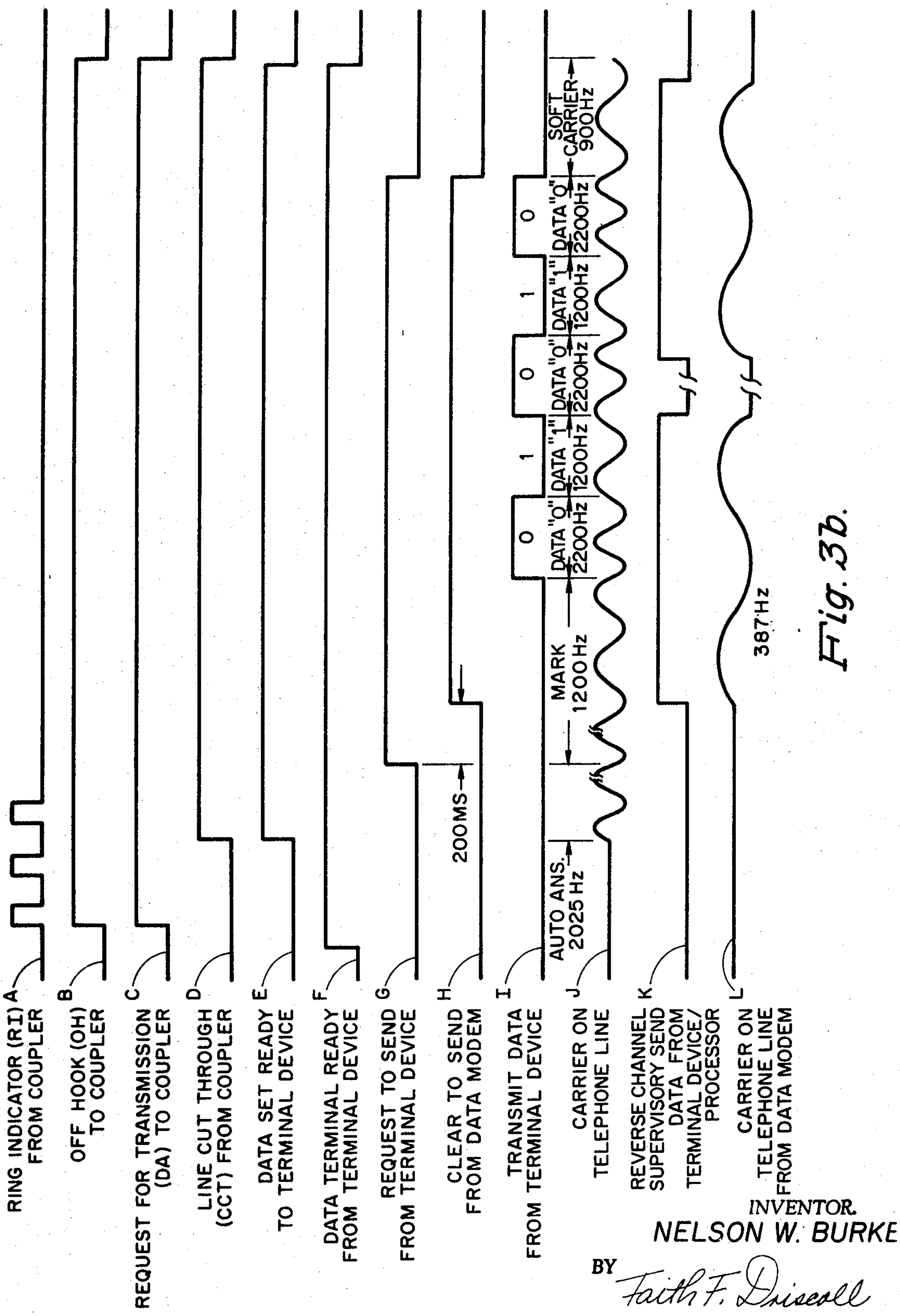
FIG. 3*b* shows waveforms useful in describing the operation of the system of FIG. 1.

The data coupler 16 in response to the aforementioned ringing signal indicates the receipt of the call to the data modem 22 which includes logic circuits for answering the call. Specifically, the data coupler 16 detects the incoming ring signal and applies a series of positive going signals to ring indicator line RI. The signals are illustrated in FIG. 3*b* as a series of pulses which correspond to waveform A. Normally, the ring signal is turned on for a period of 1.7 seconds once every 6 seconds (i.e. once for each ring).

The positive going signal applied to the line RI is shifted in level by a level converter circuit 202. This signal together with a binary 1 holding signal provided by the TERMINAL READY line, in turn causes flip-flops 206 and 212 to be switched to their binary 1 states. The flip-flop 212 forces the line OH′ to a binary 1 in turn causing level converter circuit 216 to force the line OH and the REQUEST FOR TRANSMISSION line DA to a binary 1 which permits the answering of the call. That is, line OH is forced to a binary 1 signaling notification of the call and at that time the DA line is also forced to a binary 1, signaling the coupler 16 to request a data transmission path to a local telephone channel. The above changes in line signal levels are illustrated by waveforms B and C of FIG. 3*b*.

When a transmission path is connected through the coupler 16 to the local telephone line, the data coupler 16 signals the modem 22 that data transmission may begin by forcing line CCT to a binary 1.

Following the establishment of the connection, in the manner described above, the data modem 22 transmits a tone of a first frequency of 2025 hertz for a predetermined period of time (i.e., approximately 400 milliseconds) sufficient to disable the echo suppressors and answer the call initiated by the automatic calling unit of the data processor 12. In greater detail, when a line CCT is forced to a binary 1 generating waveform D of FIG. 3b, AND gate 218 is enabled which triggers one-shot circuit 220. At that time, line 219 is forced to a binary 1 which enables gate inverters circuits 270-1a, 270-1b to switch resistors 290-1a, 290-1b in sequence into the input circuit and output circuit respectively. This conditions the generator section 251 to produce a triangular waveform having a fundamental or basic frequency of 2025 hertz. The square law detector circuit 262 converts the triangular waveform into the sinusoidal waveform I of FIG. 3b and this waveform is applied to the telephone circuit line 14.

When the automatic calling unit or coupler 18 of FIG. 1 detects the 2025 hertz tone from the sending station, it in turn switches the telephone line over to the control of the data modem of the data processor 12. It will be appreciated that the above described answering function can be handled by alternate ways such as using "reverse channel" or "hand shaking" signaling techniques.

Referring to FIG. 2a, it will be noted that the complement of the waveform applied to line 219 is applied via line 221 to gate inverter circuit 226 which ANDs the waveform with the waveform G of FIG. 3b. Since the terminal device normally forces its REQUEST TO SEND line to a binary 1 as soon as it is ready to send data, the complement of the waveform applied to line 221 inhibits the gates 236 and 238 from responding to the state of the TRANSMIT DATA line until the data modem 20 has signaled an answer to the call (i.e., generated the 2025 hertz answer tone). Accordingly, the state of the REQUEST TO SEND line is permitted to enable either of gates 236 and 238 at the trailing edge of the pulse generated by the one-shot circuit 220. Also at this time, gate 226 triggers one-shot circuit 234 and after a predetermined delay (i.e. when the data modem 22 is in condition to accept data for transmission), AND gate 232 forces the CLEAR TO SEND line to a binary 1 signaling the terminal device 10 that it can transmit data. This places the terminal in the transmit mode.

During the time interval following the generation of the answer tone when the REQUEST TO SEND line is a binary 1, and before CLEAR TO SEND line is switched to a binary 1, the data modem 22 switches line 237 to a binary 1. This conditions the generator section 251 by causing the selection of resistors 290-2a, 290-2b to generate a triangular waveform having a fundamental frequency of 1200 hertz which frequency corresponds to the system "marking" frequency. The generation of the marking frequency signals the data processor 12 that data transmission is beginning. More specifically, the normally 200 millisecond time delay interval established by one-shot circuit 234 permits line reflections caused by previous transmissions to decay and allows time for the receiving data modem carrier detection circuits (not shown) to sense the incoming signal.

Upon receipt of the CLEAR TO SEND signal from modem 22, the terminal device 10 is operative to generate timing signals, by means not shown, for applying data signals corresponding to waveform I to the TRANSMIT DATA terminal. When the signal applied to the TRANSMIT DATA terminals is a 1, it causes line 237 to be forced to a 1. When the signal is a binary 0, it forces line 239 to a binary 1. Accordingly, the generator 251 in response to lines 237 and 239 being forced to 1's is operative to generate triangular waveforms having fundamental frequencies of 1200 hertz (mark frequency) and 2200 hertz (space frequency) respectively as illustrated by waveform I in FIG. 3b. In greater detail, either one of the pairs of gate inverter circuits 270a, 2b or 270-3a, 3b is enabled, connecting either resistor pair 290-2a, 2b or 290-3a, 3b into the input circuit and output circuit of transistor 252. This in turns conditions the generator section 251 to produce triangular waveforms whose basic frequencies are established by the RC time constants selected by the levels applied to lines 237 and 239.

During data transmission, the data processor 12 through its data modem 20 is able to acknowledge the receipt of errors to the terminal device 10 through "reverse channel" communication. Of course, such transmission only occurs when the data processor 12 has not previously signaled a request to transmit. More specifically, although not shown, in FIG. 2, it will be appreciated that the control line SUPERVISORY SEND DATA is inhibited from being forced to a 1 when the REQUEST TO SEND line is a binary 1. The Transmitter Section 250 within the data processor's data modem 20, regarded as being equivalent in structure to the modem 22 of FIG. 1, is operative to generate the reverse channel frequency in accordance with a state of the SUPERVISORY SEND DATA line. More specifically, from waveforms K and L of FIG. 3b, it will be noted that the state of this line changes at a predetermined rate (i.e., 5 bits per second) which in turn causes the gate 246 of FIG. 2a to force line 247 to a binary 1 and then to a binary 0. When forced to a binary 1, the gate inverter circuits 270-5a, 5b are alternately enabled and connect the input and output circuits respectively of transistor 252 through their associated resistors 290-5a, 5b to ground. Accordingly, the generator section 251 produces a triangular waveform whose fundamental frequency corresponds to the "reverse channel" frequency of 387 hertz.

During data transmission, the receiver section of the data terminal modem 22 of FIG. 1 is operative to detect the "reverse channel" frequency and generate an appropriate control signal to the terminal device 10 via the SUPERVISORY RECEIVE DATA line. When the data processor 12 receives an erroneous data transmission, it signals the terminal device 10 by inhibiting the generation of the "reverse channel" frequency by forcing its SUPERVISORY SEND DATA line to a binary 0. The absence of the "reverse channel" frequency, when detected by the receiver section of the terminal device data modem 22, causes a change in state of the signal applied to SUPERVISORY RECEIVE DATA line, signaling the error. Depending upon the procedure followed, the data terminal 10 may retransmit the message previously transmitted until the data processor 12 acknowledges having received the message correctly.

When the terminal device 10 has completed its data transmission to the processor 12, as normally signaled to the processor 12 by the transmission of a special control character (i.e., an end of text (ETX) or end of transmission (EOT) character), it forces the REQUEST TO SEND line to a binary 0 state which signals the end of transmission to the data modem 22. The REQUEST TO SEND line when forced off or to a binary 0 state inhibits further data transmission via gates 236 and 238.

To avoid the possibility of generating line transients by abruptly terminating transmission which could produce errors in the data received by the data processor 12, the data modem 22 is operative to provide a "soft carrier turn-off" wherein the carrier is shifted downward in frequency toward a predetermined out of band frequency corresponding to 900 hertz as illustrated in FIG. 3*b*. In greater detail, when the REQUEST TO SEND line goes to a binary 0, it in turn forces gate 240 to a 1 which triggers the 100 milliseconds one-shot circuit 244. This forces line 242 to a binary 1 which enables gate inverter circuit pairs 270-4*a*, 4*b* connecting resistor pairs 290-4*a*, 4*b* to the input and output circuits of transistor 252. The generator section 251 in turn produces a triangular waveform having a fundamental frequency of 900 hertz which endures for the period of time corresponding to the width of the pulse produced by the one-shot circuit 244 (i.e., 100 milliseconds). Normally, the receiver portion of the data processor's 12 data modem 20 is operative to sense the shift in frequency and cause its RECEIVE DATA line to be clamped to a predetermined state (i.e., mark state) thereby terminating transmission. If the terminal desires release of the telephone line, it forces the TERMINAL READY line to a binary 0 which in turn switches flip-flops 206 and 216 to their binary 0 states. This causes the lines DA, and OH to be forced low signaling the data coupler to disconnect the terminal device from the line.

From the foregoing, it will be seen that the subject invention provides an improved frequency shift keyed transmitter which is capable of generating any number of frequencies required by data communications. The adding of new frequencies can be accomplished with a minimum of apparatus which normally includes in the illustrated embodiment, a pair of gate inverter circuits and associated resistor pairs.

Further and more importantly, the invention provides means for maintaining the integrity of each frequency selected at crossover time through the generation of triangular waveforms whose amplitudes are accurately controlled through adjustment of a level detector circuit. The level detector circuit in the illustrated embodiment operates as a Schmitt trigger circuit whose hystersis character is adjusted through the establishment of reference voltage levels so as to produce equal amplitudes for the triangular waveforms at all frequencies selected. Because of the aforementioned accuracy, the invention can also be used for transmitting data at lower rates where reliable transmission is desired.

It will be appreciated by those skilled that many changes may be made to the illustrated embodiment without departing from the spirit and scope of the invention. For example, although certain types of circuits such as a square law operated circuit has been disclosed, it will be understood that other types of conversion circuits such as filter networks may also be utilized for extracting the fundamental frequencies of the triangular waveforms. Further, in some instances, the conversion circuits may be eliminated entirely and only the communications channel used with satisfactory results. In addition, other types of logic circuits, transistors and voltage supplies of different polarities may also be utilized. For example, it will be obvious that other than NAND gates may be substituted for the gate inverter circuits of the generator.

While in accordance with the provision and statutes there has been illustrated and described the best form of the invention known, certain changes may be made to the circuits described without departing from the scope of the invention as set forth in the appended claims and that in some cases, certain features of the invention may be used to advantage without a corresponding use of other features.

Having described the invention, what is claimed is new and novel and for which it is desired to secure Letters Patent is:

1. A transmitter for generating frequency signals for application to a communication channel in response to signals applied to said transmitter by an input device, said transmitter comprising:

control logic means including means for generating at least one bilevel selection signal in response to said device signals;

generating means directly coupled to said control logic means and being conditioned by one level of said one selection signal to generate a triangular waveform having a predetermined fundamental frequency in accordance with said one level; and, means coupled to said generating means and to said channel, said means being operative to receive said triangular waveform and to apply a corresponding signal to said channel.

2. A device for generating frequency shift keying signals for application to a communications channel in response to input data and control signals applied from a data processing unit, said device comprising:

control logic means coupled to said data processing unit and being operative to produce bilevel frequency selection signals when conditioned by said input data and control signals from said processing unit;

transmitting means coupled to said control logic means, said transmitting means including generating means connected to be responsive to said selection signals for generating triangular waveforms of predetermined fundamental frequencies; and, means coupled to said generating means and being operative to receive said triangular waveforms and to apply signals corresponding to said frequency shift keying signals to said channel.

3. A FSK transmitter for generating frequency modulated signals for application to a communication channel comprising:

frequency selection means connected to receive a number of input selection lines, said frequency selection means being operative to generate output signals in accordance with different states of said input selection lines;

triangular waveform generating means including an input terminal and an output terminal, said input terminal being coupled to said frequency selection means and being conditioned by different ones of said output signals to generate triangular waveforms of predetermined fundamental frequencies at said output terminal; and, means coupled to said triangular waveform generating means and to said channel, said means being operative to receive said triangular waveforms and to apply corresponding signals to said channel.

4. The transmitter according to claim 3 wherein said frequency selection means includes:

a plurality of gating means for receiving said number of input selection lines, a first half group of said plurality of gating means being coupled to the input terminal of said triangular generating means and a second half group of said plurality being connected to receive a different one of said bilevel control selection signals; and, wherein said triangular waveform generating means includes:

capacitor storage means;

current generating means coupled to said input terminal and said output terminal in common with said capacitor storage means; and, bilevel voltage level switching means, said voltage level switching means coupled to said capacitor storage means and being responsive to predetermined levels of voltage stored by said capacitor means to produce a pair of alternately changing complementary control signals enabling alternately a selected one of said gating means from said first and second groups for conditioning said current generating means to charge and discharge said capacitor storage means at a predetermined rate for producing one of said triangular waveforms having one of said predetermined frequencies.

5. The transmitter according to claim 4 wherein said frequency selection means further includes:

a plurality of impedance means equal in number to said plurality of gating means, a different one of a first half of said plurality of impedance means being coupled to said input terminal of said triangular generating means and to a predetermined one of said gating means of said first group and a different one of a second half of said plurality of impedance means being coupled to said output terminal of said current triangular generating means and to a predetermined one of said gating means of said second group; and, said selected gating means of said first group being operative to condition said current generating means to charge said capacitor storage means at said predetermined rate of current by applying a predetermined voltage level to said input terminal, said predetermined level being established by the value of said impedance means associated therewith, said selected gating means of said second group being operative to discharge said capacitor storage means through said impedance means at said predetermined rate of current established by the impedance value of said impedance means associated therewith, said level switching means being operative to switch the state of said pair of complementary control signals only in response to said predetermined voltage levels to produce equal amplitude values for a triangular waveform generated at each of said frequencies by the alternate enabling of said gates for selected pairs of said plurality of gates.

6. The transmitter according to claim 4 wherein said voltage level switching means includes:

a feedback circuit means including:

series connected first and second inverter gating means, each having input and output terminals; and, bilevel voltage reference means having one end directly coupled to said output terminal of said second inverter gating means; and, comparator amplifier switching means including:

an inverting input terminal, a noninverting input terminal and an output terminal, said inverting input terminal being coupled to said capacitor storage means, said noninverting terminal being coupled to the other end of said voltage reference means and said output terminal being connected to said first gating means input terminal, and said comparator switching means being operative when said predetermined voltage levels applied to said inverting terminal approximate first and second voltage levels established by said voltage reference means to switch the state of each of said pair of complementary control signal levels applied to said output terminals of said comparator amplifier switching circuit means and said first gating means.

7. The transmitter according to claim 6 wherein said bilevel voltage reference means includes:

first, second and third resistors, and a voltage source, said first resistor being connected at one end to said voltage source in common with said noninverting terminal and the other end of said first resistor being connected in common with one end of each of said second and third resistors, the other end of said second resistor being connected to ground reference potential; and, wherein said second inverter gating means includes:

an output transistor circuit having base, emitter and collector electrodes, said base electrode being connected to be responsive to the state of one of said pair of said complementary control signal levels at said amplifier switching circuit means output terminal, said emitter electrode being connected to ground reference potential and said collector electrode being connected in series with the other end of said third resistor whereby a change of said state of said control signal level conditions said output transistor to selectively connect said third resistor to said ground reference potential through said collector and emitter electrodes thereby conditioning said voltage reference means for alternately establishing said first and second predetermined voltage levels in accordance with said pair of complementary control signal levels for accurately maintaining said triangular waveforms at a constant amplitude of all of the frequencies selected.

8. The transmitter of claim 7 wherein said third resistor is variable resistance adjusted for selecting a value of voltage for one of said predetermined voltage levels for establishing linear charging and discharging current rates for said capacitor storage means.

9. The transmitter according to claim 5 wherein each of said gating means of said first and second groups includes:

an input logic gate stage coupled in series with an output stage, said input gate transistor stage having at least first and second input terminals and an output terminal, said first and second input terminals being connected to receive a predetermined one of said pair of complementary signals and a predetermined one of said input selection lines respectively, said output transistor stage having an input terminal and an output terminal, said input terminal being connected to said output terminal of said input transistor stage and said output terminal being connected in series with said different one of said impedance means whereby the concurrent application of signals representative of binary ONES at said first and second input terminals conditions said input gate transistor stage to switch said output stage on so as to connect said impedance means to a ground reference potential.

10. The transmitter according to claim 9 wherein said input logic gate and said output stage are contructed of transistor transistor logic circuits.

11. The transmitter according to claim 5 wherein each of said gating means of said first and second groups include NAND gating circuits.

12. The transmitter according to claim 4 wherein each of said gating means includes:

a logic gating circuit having first and second input terminals for receiving a predetermined one of said input selection lines and a one of said pair of complementary control signals, and an output terminal; and, wherein said input selection means further includes:

a plurality of resistors, each resistor of a first half group of resistors being connected at one end to said output terminal of a different one of said gating circuits in said first half group and the other end of said each resistor being connected to the input of said generating means and each resistor of a second half group of resistors being connected at one end to said output terminal of a different one of said gating circuits in said second half group and the other end of said each resistor being connected to said output of said generating means; and, each of said selected one of said gating means of said first half group being operative when the states of both said input selection line and said one of complementary control signals are binary ones to connect said associated resistor to ground potential so as to apply a predetermined voltage level to said current generating means for charging said capacitor storage means at a predetermined rate and each of said selected one of said gating means of said second group being operative when the states of both said input selection line and the other one of said pair of said complementary control signals are binary ONES to connect said associated resistor to said ground potential for discharging said capacitor storage means at said predetermined rate.

13. The transmitter according to claim 12 wherein each of said logic circuits are NAND gates constructed of transistor transistor logic circuits.

14. The transmitter according to claim 12 wherein each of said logic gating circuits includes:

AND logic gating means and output inverter transistor means having base, emitter and collector electrodes, and base electrode connected to be responsive to an output signal from said AND gating means, said collector electrode being connected to said output terminal and said emitter electrode being connected to a ground reference potential, and wherein said current generating means includes:

voltage biasing means; and, transistor amplifying means, said amplifying means having base, emitter and collector electrodes, said base electrode being connected in common with said other end of each of said resistors of said first half group to said voltage biasing means, said emitter electrode being connected to said voltage biasing means, said collector electrode being connected to said other end of each of said resistors of said second half group, each of said resistors of said first half group when selected being arranged to apply a different voltage level to said base electrode for conditioning said transistor amplifier means to produce a different value of current for charging said capacitor storage means at said predetermined rate and each of said resistors of said second half group when selected connecting said capacitor storage means to said ground reference potential through the collector and emitter electrodes of said output transistor means for discharging said capacitor storage means at said predetermined rate established by the time constant of said capacitor storage means and said selected resistor.

15. The transmitter according to claim 14 wherein each of said AND gating means and said inverter transistor means is contructed of transistor transistor logic circuits.

16. The transmitter according to claim 3 wherein said means includes conversion means having an input terminal and an output terminal, said input terminal being coupled to said output terminal of said triangular wave generating means and said output terminal being coupled to said communication channel, said conversion means being operative to shape each of said triangular waveforms into a sinusoidal waveform whose frequency corresponds to said predetermined fundamental frequency of said triangular waveform.

17. The transmitter according to claim 14 wherein said conversion means includes a square law operated circuit connected to convert each of said triangular waveforms into a sinusoidal waveform.

18. The transmitter according to claim 17 wherein said square law operated circuit includes first and second non-linear unidirectional current conducting means, said first and second non-linear means being connected in parallel so as to conduct current in opposite directions and being operative to convert each of said triangular waveforms into said sinusoidal waveform.

19. The transmitter according to claim 18 wherein said first and second means are diodes, each having anode and cathode terminals, said anode terminal of one diode being connected in common with the cathode terminal of said other diode to form an input/output terminal for receiving said triangular waveform and said cathode terminal of said one diode being connected to a reference voltage potential in common with said anode terminal of said other diode, each of said diodes being biased to operate in its non-linear region to produce said sinusoidal waveform at said input/output terminal.

20. A data modem system for generating frequency signals for transfer to a communications channel in response to bilevel signals applied thereto by an input device, said system comprising:

control logic means including means for generating at least one of a plurality of bilevel frequency selection signals on a corresponding one of n selection lines wherein n is any integer, in response to said bilevel signals;

modulator means coupled to at least one of said selection lines and to said channel, said modulator means including:

a plurality of resistor means;

a number of pairs of logic gating means, said number being equal to the number of selection lines received by said modulator means, each having at least first and second input terminals, and an output terminal, said first input terminal of each pair of said gating means being connected to a different one of said lines, the output of each of said gating means being connected in series with a different one of said resistor means; and, generating means for producing a triangular waveform of a different fundamental frequency in response to a different one of said bilevel selection signals, said generating means having an input and output terminal, said input terminal being connected in common to the resistor means of one of said gating means of each of said pairs, said output terminal being connected in common to the resistor means of the other one of said gating means of each of said pairs, and said generating means further including bilevel detector means having an input terminal coupled to said output terminal and first and second output terminals respectively for generating a pair of complementary control signal levels whose state changes in response to said triangular waveform reaching first and second predetermined voltage levels, said detector means first output terminal being connected to said second input terminal of said one gating means of each of said pairs and said second output terminal being connected to said output terminal of said other gating means of each of said pairs whereby said detector means is operative in response to a bilevel selection signal to generate said alternately changing complementary control signal levels for alternately conditioning a selected pair of gating means designated by said selection signal to produce said triangular waveform of a predetermined fundamental frequency.

21. A modem system of claim 20 wherein said modulator means further includes:

conversion means coupled to said generating means and to said channel, said conversion means being operative in response to said triangular waveform to shape said waveform into a sinusoidal waveform whose frequency corresponds to the fundamental frequency of said triangular waveform.

22. The modem system of claim 21 wherein said conversion means includes a square law operated circuit.

23. The modem system of claim 20 wherein said generating means further includes:

a transistor current source having an input circuit and an output circuit, said input circuit being coupled to said input terminal of said generating means, and said output circuit being coupled to said output terminal of said generating means;

a capacitive storage means coupled to said output terminal; and, said transistor input circuit being conditioned by a first of said selected pair of said resistor means to apply predetermined voltage levels for conditioning said current source to charge said capacitive storage means at a predetermined rate and said transistor output circuit being conditioned by the second of said selected pair to discharge said capacitive storage means at said predetermined rate for producing said triangular waveform.

24. The modem system of claim 23 wherein n equals one and each of said resistor means connected to said pair of logic gating means is selected to have values respectively for conditioning said current source to charge said capacitor storage means and for discharging said capacitor storage means at said predetermined rate for producing said triangular waveform whose fundamental frequency corresponds to a first predetermined frequency.

25. The modem system of claim 2 wherein said predetermined frequency is 2025 hertz.

26. The modem system of claim 24 wherein said predetermined frequency is 387 hertz.

27. The modem system of claim 23 wherein n equals two and wherein said control logic means includes:

a first input terminal coupled to said input device for receiving bilevel information signals representative of binary ONE and binary ZERO data;

a second input terminal coupled to said input device for receiving a bilevel signal indicative of a request to send information;

logic gating means coupled to said terminals for generating first and second bilevel signals representative of binary ONE and binary ZERO data respectively in response to said information signals and to said bilevel signal; and, means for applying said first and second bilevel signals to different ones of said selection lines.

28. A transmitter for generating frequency signals for application to a communication channel in response to signals applied to said transmitter by an input device, said transmitter comprising:

control means including;

an input terminal coupled to said input device for receiving a bilevel data signal representative of binary ONE and binary ZERO information from said input device; and, means for generating at least one bilevel selection signal, said means being coupled to said input terminal and including logic gating means responsive to said bilevel data signal to generate first and second bilevel selection signals representative respectively of binary ONE and binary ZERO data;

generating means coupled to said control logic means and being conditioned by said bilevel selection signals to generate triangular waveforms having first and second fundamental frequencies representative respectively of said binary ONE and binary ZERO data; and, means coupled to said generating means and to said channel, said means being operative to receive said triangular waveforms and to apply corresponding signals to said channel.

* * * * *

UNITED STATES PATENT OFFICE

CERTIFICATE OF CORRECTION

Patent No. 3,752,923 Dated August 14, 1973

Inventor(s) Nelson W. Burke

It is certified that error appears in the above-identified patent and that said Letters Patent are hereby corrected as shown below:

Column 18, line 58, delete "of" and insert --for--.

Column 19, line 20, delete "contructed" and insert --constructed--.

Column 19, line 49, change "ones" to --ONES--.

Column 20, line 1, delete "and" and insert --said--.

Column 20, line 34, delete "contructed" and insert --constructed--.

Signed and sealed this 18th day of December 1973.

(SEAL)
Attest:

EDWARD M. FLETCHER, JR.
Attesting Officer

RENE D. TEGTMEYER
Acting Commissioner of Patents